United States Patent
Arbesman

(12) 
(10) Patent No.: US 6,367,600 B1
(45) Date of Patent: Apr. 9, 2002

(54) DISC BRAKE BACKING PLATE AND METHOD OF MANUFACTURING SAME

(76) Inventor: Ray Arbesman, Toronto (CA)

( * ) Notice: Subject to any disclaimer, the term of this patent is extended or adjusted under 35 U.S.C. 154(b) by 0 days.

(21) Appl. No.: 09/485,497

(22) PCT Filed: Jan. 4, 1999

(86) PCT No.: PCT/CA99/00011

§ 371 Date: Jun. 12, 2000

§ 102(e) Date: Jun. 12, 2000

(87) PCT Pub. No.: WO99/64762

PCT Pub. Date: Dec. 16, 1999

(30) Foreign Application Priority Data

Jun. 10, 1998 (CA) ............................................. 2240227

(51) Int. Cl.$^7$ ........................... F16D 69/04; B23P 15/18
(52) U.S. Cl. ................................ 188/250 G; 188/250 B
(58) Field of Search ......................... 188/73.1, 250 B, 188/250 G, 234

(56) References Cited

U.S. PATENT DOCUMENTS

| | | | |
|---|---|---|---|
| 1,336,752 A | 4/1920 | Muller | |
| 2,879,866 A | 3/1959 | Newell | 188/234 |
| 4,428,214 A | 1/1984 | Head | 72/69 |
| 4,569,424 A | 2/1986 | Taylor | 188/250 G |
| 4,588,050 A | 5/1986 | Urban | 188/73.1 |
| 4,640,390 A | 2/1987 | Saumweber | 188/73.37 |
| 4,799,579 A | 1/1989 | Myers | 192/107 M |
| 5,141,083 A | 8/1992 | Burgoon | 188/73.1 |
| 5,236,528 A | 8/1993 | Nakagawa | 156/153 |
| 5,285,873 A | 2/1994 | Arbesman | 188/73.1 |
| 5,890,566 A | 4/1999 | Yoshida | 188/73.1 |
| RE36,313 E | 9/1999 | Kahr | 188/250 R |

FOREIGN PATENT DOCUMENTS

| | | |
|---|---|---|
| CA | 618550 | 4/1961 |
| DE | 2242877 | 3/1974 |
| DE | 2423870 | 12/1974 |
| DE | 2427694 | 12/1975 |
| EP | 0349497 | 1/1990 |
| GB | 319856 | 10/1929 |
| JP | 55139577 | 10/1980 |
| JP | 5631535 | 3/1981 |

*Primary Examiner*—Christopher P. Schwartz
(74) *Attorney, Agent, or Firm*—Moser, Patterson & Sheridan, L.L.P.

(57) ABSTRACT

According to a first aspect of the invention, a disc brake backing plate (1) comprises a plate having at least (one retaining structure (3) defined on a first surface (2) thereof for securing a friction material (10) to the first surface (2). Each retaining structure (3) has at least one nib (6) surrounded by a ridge (5). Each retaining structure (3) includes two diverging nibs (6) projecting out of a circular depression (4) formed in the first surface (2). The ridge (5) surrounds the depression (4). According to a second aspect of the invention, a method of manufacturing the backing plate (1) is disclosed. The method comprises a first step of punching a plate (1) to form a depression (4) within the first surface (2) thereof, the depression (4) having a projection protruding outwardly therefrom. The method comprises a second step of punching the plate (1) to form a ridge (5) surrounding the depression (4). The first surface (2) is punched with a second punching tool (42) to divide the projection (30) into two nibs (6) and to form an annular ridge (5) surrounding the depression (4).

24 Claims, 5 Drawing Sheets

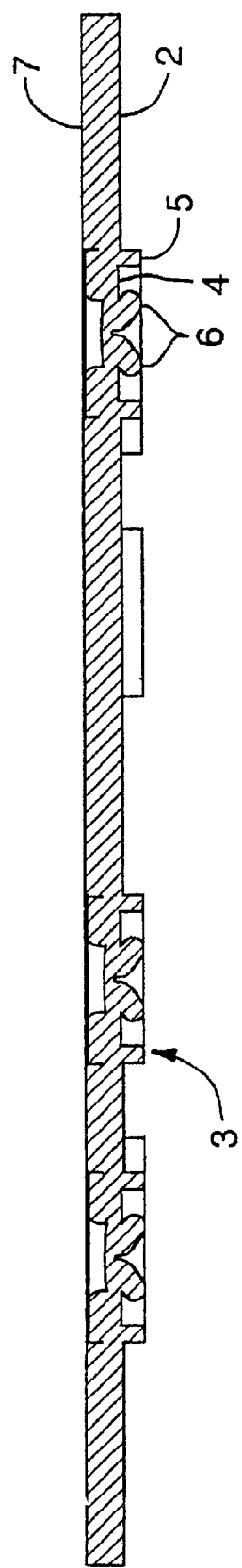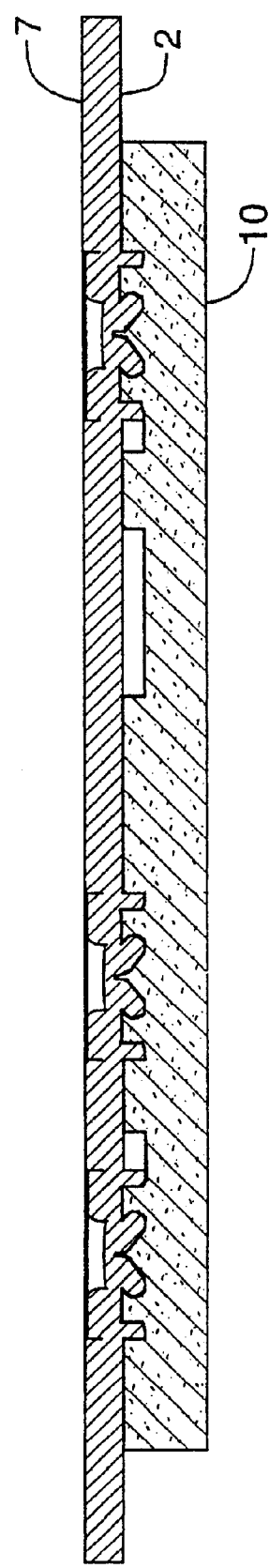

DISC BRAKE BACKING PLATE AND METHOD OF MANUFACTURING SAME

TECHNICAL FIELD

This invention relates to disc brakes for motor vehicles, and in particular to an improved disc brake backing plate, as well as a method of manufacturing the backing plate.

BACKGROUND ART

Although disc brakes have been used on motor vehicles for many years, their use has increased substantially in recent years. In particular, there has been a significantly increased use of disc brakes on lower priced cars and trucks, with a consequent interest in methods of reducing the cost of manufacturing disc brakes and replacement parts therefor on the part of both motor vehicle manufacturers and suppliers of parts for disc brakes. This increased use has also led to a significant increase in the after-market for disc brake replacement and repair.

Disc brakes, as currently manufactured, combine two main parts namely a backing plate and a friction pad. The backing plate is mounted in a brake assembly, and may be formed by stamping a suitable metal blank to produce a backing plate with a variety of bosses, holes, or other features for receiving and retaining the friction pad. The need to use high speed low cost manufacturing methods often results in irregularities in the backing plate which may lead to difficulties in attaching and/or retaining the friction pad on the backing plate during braking, when the friction pad is in contact with the rapidly turning brake rotor, or even during the pre-installation handling of the brake pad assembly.

There are a variety of known ways of attaching a friction pad to a backing plate. One such way is to attach the friction pad to the backing plates using rivets. One disadvantage of the riveting process is that it creates a rigid bond between the backing plate and the friction pad, which can, as a result of a sudden impact, lead to breaking of the friction pad. Furthermore, this process often requires one or more additional manufacturing steps with a consequent increase in cost. In addition, when the friction pad is worn down over time, the rivets become exposed and rub against the brake rotor, causing scoring on the rotor which is costly to repair.

Another, more recently developed method of mounting the friction pad on the backing plate is to use a pressurised molding process to mold the friction material directly onto the backing plate. In this process, the friction pad may be prepared by blending the components of the friction pad into a pre-form material or cake. A conventional pressurized molding system is used to mold the friction pad pre-form onto the backing plate. A layer of adhesive, such as cement or glue is often applied to the contact surface of the backing plate to improve the adhesion between the backing plate and the friction pad.

As pressure is applied to the mold assembly, the pre-form becomes heated and begins to flow, filling the mold and covering the appropriate surface of the backing plate. In this process, the pre-form material is intended to flow into and around the various features to improve the bond between the backing plate and the friction pad.

There is a need for a backing plate which provides improved shear and tensile strength in the bond between the friction pad and backing plate, compared to the strength which is provided by features, such as holes and bosses, stamped into the backing plate. Furthermore, when additional features are stamped into prior art backing plates to increase bond strength, additional manufacturing steps are required, adding to the cost.

The most common prior art features stamped into backing plates are circular holes. These holes often provide unsatisfactory results because, during the molding process, the pre-form cake does not completely fill all of the holes, which in turn, leads to deficient bonding between the backing plate and the pre-form. The incomplete hole fills can are clearly visible, and often raise quality concerns when inspected by buyers. The incomplete hole fills also have an aesthetically displeasing appearance, which can also make them less attractive to customers. Accordingly, it has become common practice in prior art backing plates to fill the incomplete hole fills with putty and to paint over them, to both hide the unsatisfactory molding results and to improve appearance. These additional manufacturing steps have the added disadvantage of increasing the cost of manufacturing the disc brake.

Another example of a prior art backing plate is disclosed in U.S. Pat. No. 5,141,083. This patent discloses retaining structures which include a ridge surrounding a depression. However, the patent does not disclose a nib surrounded by a ridge which together act to trap the friction material to provide an improved bond between the backing plate and the friction material.

The backing plate is subjected to a number of forces, such as the jarrring of the moving vehicle, as well as vibration caused by the rotor and noise. Accordingly, there is a need for a backing plate which provides improved structural strength, and is able to reduce the likelihood of premature failure.

Consequently, there is a need for a disc brake backing plate and a method of manufacturing same which can provide improved bonding with the friction pad without increasing the cost of producing the backing plate.

DISCLOSURE OF INVENTION

It is an object of the invention to provide a backing plate which provides an improved bond between it and the friction pad, thereby eliminating the need for adhesive application. In addition, it is an object of the invention to increase the structural strength of the backing plate, without increasing the cost of producing the backing plate.

According to a first aspect of the invention, a disc brake backing plate comprises a plate having at least one retaining structure defined on a first surface thereof for securing a friction material to the first surface. Each retaining structure has at least one nib surrounded by a ridge. Preferably, each retaining structure includes two diverging nibs projecting out of a circular depression formed in the first surface. The ridge preferably surrounds the depression.

According to a second aspect of the invention, a method of manufacturing the backing plate is disclosed which reduces time and cost by requiring fewer manufacturing steps, while at the same time improving the structural strength of the backing plate.

A method of manufacturing a disc brake backing plate for securing a friction material to a first surface thereof is disclosed. The method comprises the step of punching a plate to form a depression within the first surface thereof, the depression having a projection protruding outwardly therefrom. Preferably, the first surface of the plate is punched with a first punching tool to form a cylindrical projection surrounded by an annular depression. The first punching tool preferably comprises an elongate cylindrical member having a cylindrical longitudinal channel defined therein.

Preferably, before the first step, a second surface of the plate is placed against a flat surface having a cylindrical recess defined therein. The recess preferably defines a central opening therein. The opening is preferably adapted to secure a first bushing therein. The first bushing preferably projects from the recess.

Preferably, the method comprises a second step of punching the plate to form a ridge surrounding the depression. Preferably, the first surface punched with a second punching tool to divide the projection into two nibs and to form an annular ridge surrounding the depression. The second punching tool preferably has a chisel projecting from a central recessed portion thereof. Preferably, the second punching tool has a larger diameter than the first punching tool.

Prior the second step, the second surface of the plate is preferably placed against a flat surface having a second surface opening defined therein. The second surface opening is preferably adapted to secure a second bushing therein.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with references to the accompanying drawings, in which:

FIG. 6 is a cross-sectional view along line A—A of FIG. 3;

FIG. 7 is a cross-sectional view along line A—A of FIG. 3 showing the friction pad;

BEST MODE FOR CARRYING OUT THE INVENTION

Figure 1:
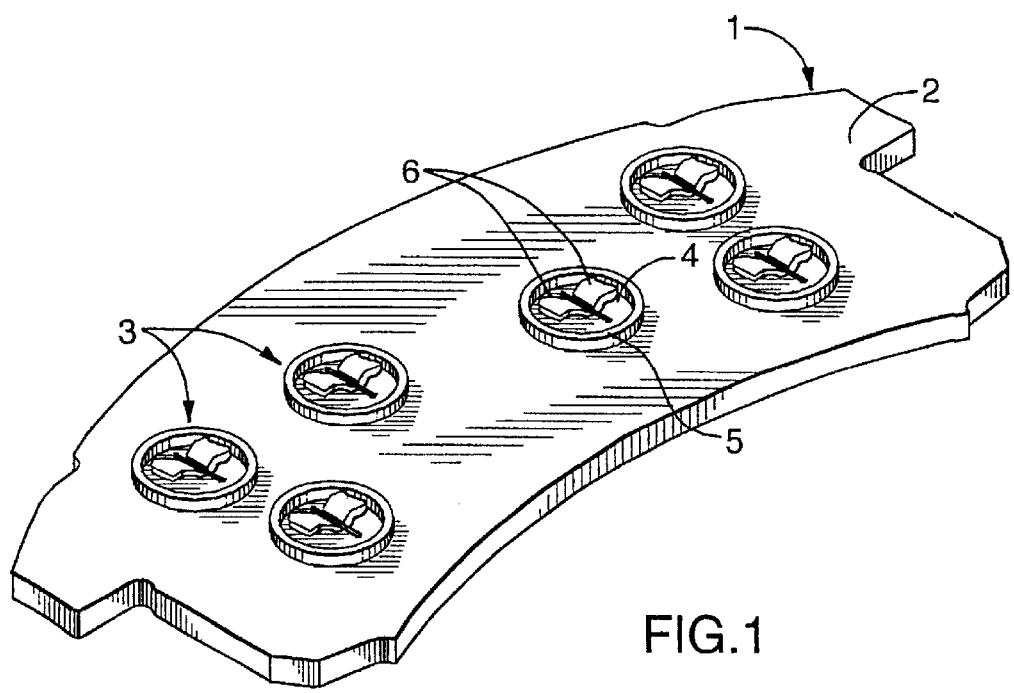
FIG. 1 is a perspective view of a preferred embodiment of the invention showing the first surface.
Figure 2:
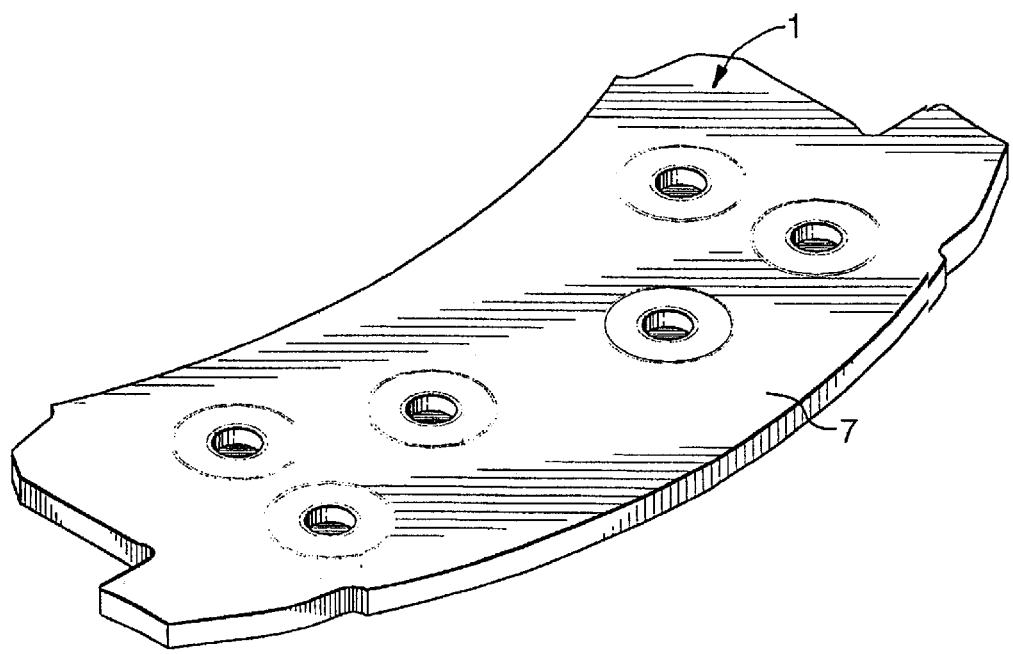
FIG. 2 is a perspective view of the preferred embodiment showing the second surface.
Figure 3:
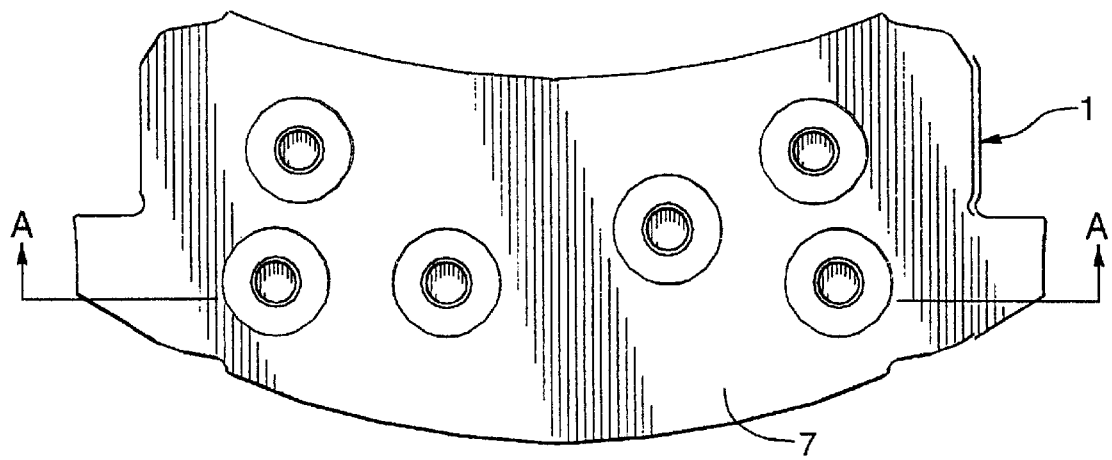
FIG. 3 is a plan view of the second surface of the preferred embodiment.
Figure 4:
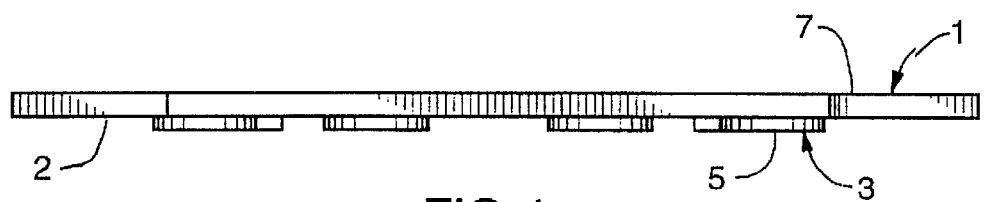
FIG. 4 is an elevation view of the preferred embodiment.
Figure 5:
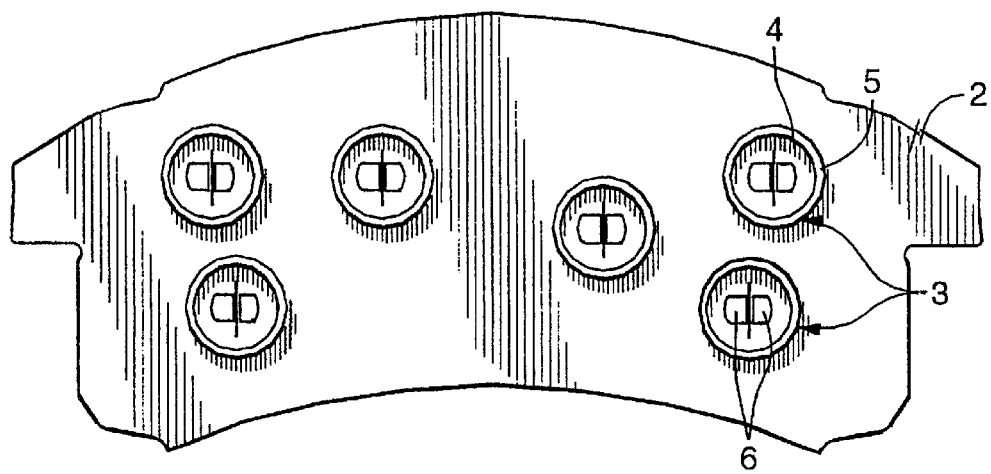
FIG. 5 is a plan view of the first surface of the preferred embodiment.

FIGS. 1 and 2 show the preferred embodiment of the present invention, where a backing plate 1 of a conventional shape and thickness (⅛–½ of an inch), made preferably from metal or a metal composite, is adapted to withstand the rigors; of a conventional disc braking system. The backing plate has a first surface 2 and a second surface 7. A friction pad 10 (shown in FIG. 7) is to be molded to the first surface by a conventional molding process. Any suitable number of retaining structures 3 are connected to the first surface of the backing plate. Preferably, the retaining structures are integrally formed by punching or stamping the backing plate, as described in more detail below. The number of the retaining structures can vary with the size of the backing plate and the strength of the bond required, which, in turn, varies depending on the type of vehicle. The preferred arrangement of the retaining structures is for each group of three structures to form the vertices of an equilateral triangle. The perimeter of the triangle again depends on the type of vehicle where the backing plate will be installed.

Referring to FIGS. 1, 5, 6, and 7, each retaining structure preferably comprises a circular depression 4 surrounded by an annular ridge 5 projecting from the first surface 2. At least one nib projects out of the depression. It will be understood by those skilled in the art that the nib can be one or more of any kind of projecting members or boss. Preferably, two nibs 6 divergingly project from the surface of the depression 4 above the first surface 2. Preferably, the outside diameter of the annular ridge is between ½ "(1.28 cm) and 1"(2.56 cm), and the height of the nibs and the ridge is between 0.07"(1.8 mm) and 0.1"(2.6 mm), such that they protrude below wear sensor specification dimensions.

The backing plate 1 according to the present invention does not need to be coated with an any adhesive to achieve the required bond strength with the friction pad. In addition, the surfaces of the backing plate can be plated to improve its resistance to rust and its aesthetic appearance. The plating eliminates the need to paint the backing plate.

Figure 8:
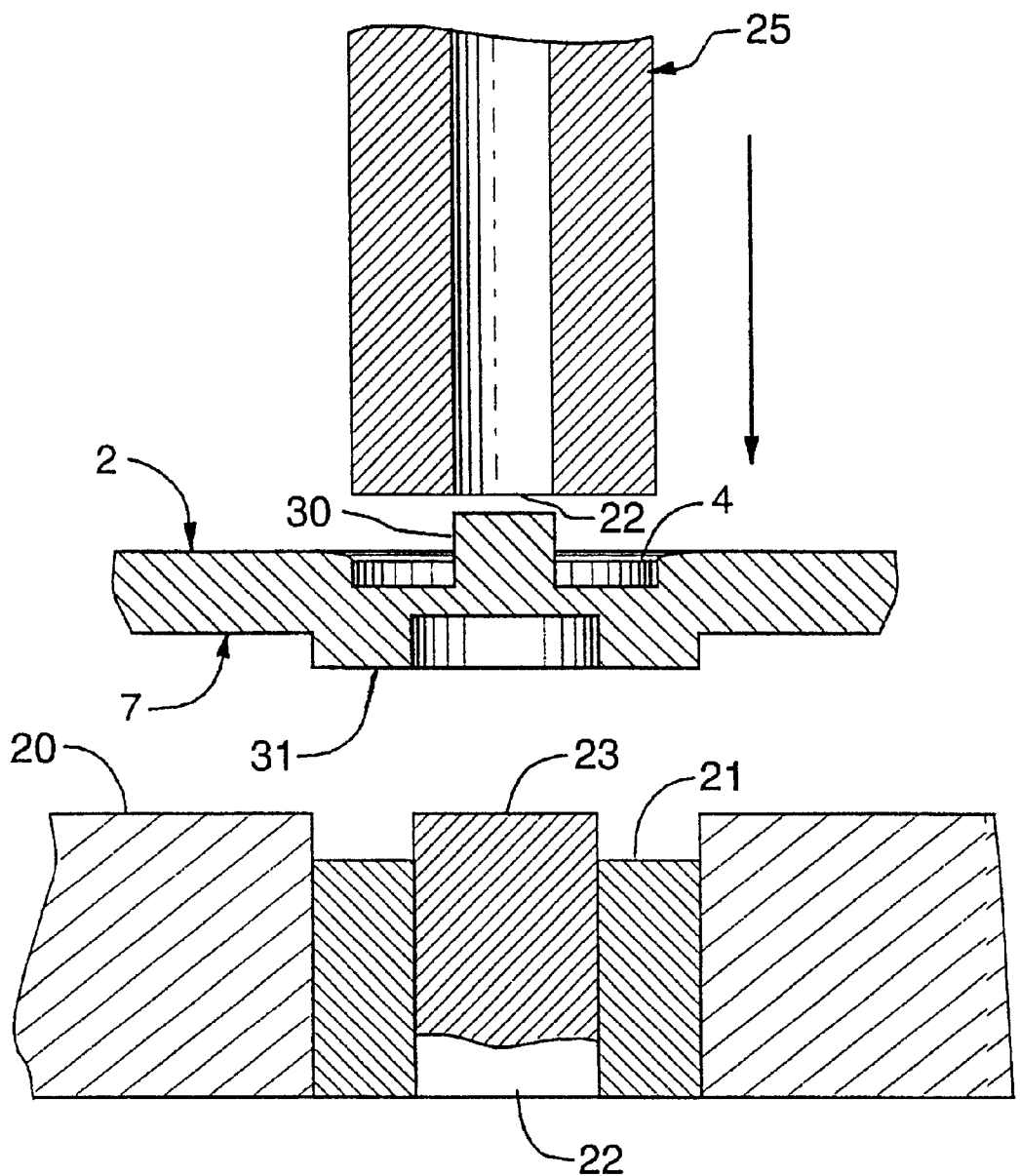
FIG. 8 is a partial cross-sectional view of the first step of the process according to a preferred embodiment of the present invention.

FIG. 8 shows the first step in the method of manufacturing the backing plate 1, according to the preferred embodiment of the present invention. Preferably, the second surface 7 of the backing plate rests on a flat surface 20 having a cylindrical recesss 21 defined therein. Preferably the recess has a central opening 22 within which a bushing 23 is secured in a conventional manner. The bushing is positioned such that it projects from the recess 21 and preferably projects out the first surface. The first face 2 of the backing plate is then punched by a first punching tool 25. The first punching tool is preferably a cylindrical member with a longitudinal central channel 22 preferably having a circular cross-section. The force of the first punching tool forms the depression 4 from which a projection, such as the generally cylindrical projection 30, projects into the longitudinal central channel of the first punching tool. The force of the first punching tool drives the backing plate material into the recess 21, which surrounds the bushing 23, to form an annular protrusion 31 in the second surface 7. The height of the projection 30 can be adjusted by increasing or decreasing the force of the impact.

Figure 9:
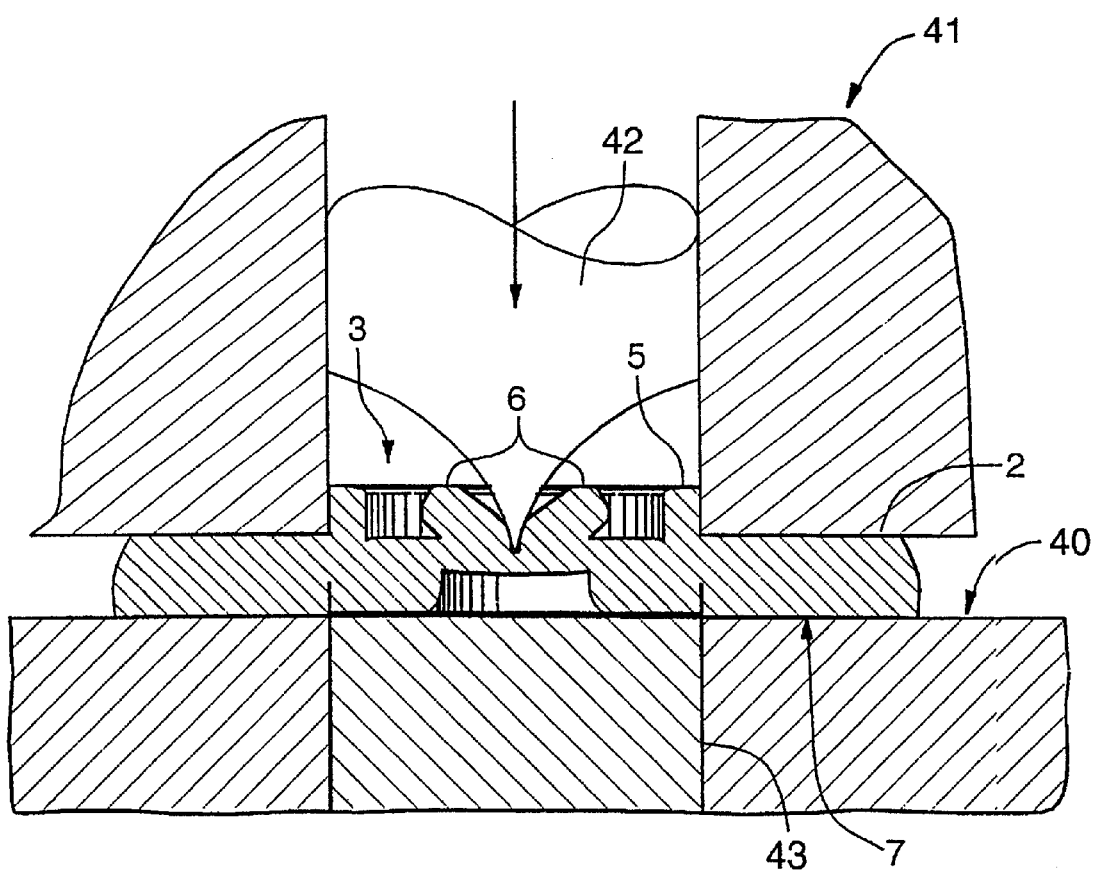
FIG. 9 is a partial cross-sectional view of the second step of the process.

FIG. 9 shows the final step in the method. The second surface 7 off the backing plate is placed on a flat surface 40, such that each retaining structure 3 is positioned over a second bushing 43 which is conventionally secured within a second surface opening of the flat surface 40. The second bushing preferably projects from the flat surface by 0.005" (0.13 mm). Alternatively, the second bushing may be flush with the flat surface 40, or may project from the flat surface by less than 0.005" (0.13 mm).

The first surface 2 is then punched by a second punching tool 41. The second punching tool is preferably a cylindrical member of a larger diameter than the first punching tool. Preferably, a chisel 42 is conventionally secured within a central portion of the second punching tool. The impact of the second punching tool causes the material of the annular protrusion 31 to compress and flow to form the annular ridge 5. The protruding second bushing 43 insures that all backing plate material is flush with or below the second surface 7 of the backing plate 1, as required by design specifications for disc brake backing plates. At the same time, the chisel splits the cylindrical projection 30 into preferably two diverging nibs 6 to complete the retaining structure 3. It will be understood by those skilled in the art that the second punching tool may be altered to create any suitable number of nibs or other projecting members, and such variations are within the scope of this invention.

The process is then repeated to form additional retaining structures on the backing plate, as needed to develop the required tensile and shear strength in the bond between the backing plate and friction pad.

During the process of molding and securing the friction pad to the backing plate, the pre-form material is set into a mold and pressed against the backing plate. The material flows into and surrounds each retaining structure 3 to bond with the backing plate 1. The inner surface of the ridge 5 and the diverging nibs 6 trap all compressed friction material to provide improved tensile strength, and thereby reduce the likelihood of separation of the friction pad from the backing plate. The outer surface of the ridge provides resistance to shear forces generated between the friction pad and the backing plate. The tensile and shear strengths can be varied by changing either the height of the ridge and nibs, or the number of nibs, depending on the bond strength required for a particular application. These results are accomplished using a two step process, and without thee need for additional features, such as holes, leading to a decreased manufacturing time and significant cost savings.

It will be appreciated that the above description relates to the preferred embodiment by way of example only. Many variations on the invention will be obvious to those knowledgeable in the field, and such obvious variations are within the scope of the invention as described and claimed, whether or not expressly described.

Industrial Applicability

The disc brake backing plate and the process of manufacturing same according to the present invention are useful in the field of manufacturing of automotive parts.

What is claimed is:

1. A disc brake backing plate comprising a plate having a plurality of retaining structures defined on a first surface thereof for securing a friction material to the first surface, each retaining structure having at least one nib projecting out of the first surface and surrounded by a ridge.

2. The disc brake backing plate of claim 1, wherein the retaining structure further comprises a depression, the nib being positioned in the depression.

3. The disc brake backing plate of claim 2, wherein the ridge surrounds the depression.

4. The disc brake backing plate of claim 3, wherein the retaining structure is constructed integrally with the backing plate.

5. The disc brake backing plate of claim 2, wherein the retaining structure has two nibs.

6. The disc brake backing plate of claim 5, wherein the nibs project divergingly out of the depression.

7. The disc brake backing plate of claim 6, wherein the depression is substantially circular.

8. The disc brake backing plate of claim 7, wherein the ridge surrounds the depression.

9. The disc brake backing plate of claim 8, wherein the ridge has an annular shape.

10. The disc brake backing plate of claim 9, wherein the retaining structure is constructed integrally with the backing plate.

11. A disc backing plate comprising a plate having a plurality of retaining structures defined on a first surface thereof for securing a friction material to the first surface, each retaining structure having:

(a) a substantially circular depression defined within the first surface;

(b) an annular ridge surrounding the depression; and (c) two nibs divergingly projecting out of the depression above the first surface.

12. A method of manufacturing a disc brake backing plate for securing a friction material to a first surface thereof, the method comprising:

placing a second surface of the plate against the flat surface having a cylindrical recess defined therein, the recess defining a central opening therein, the opening adapted to secure a first bushing therein, the first bushing projecting from the recess.

punching the plate to form a depression within the first surface thereof, the depression having a projection protruding outwardly therefrom; and punching the plate to form a ridge surrounding the depression.

13. A method of manufacturing a disc brake backing plate as defined in claim 12, wherein the depression and projection are formed by impacting the first surface with a first punching tool. the first punching tool comprising an elongate member having a longitudinal channel, the longitudinal axis of the first punching tool being aligned with the longitudinal axis of the first bushing.

14. A method of manufacturing a disc brake backing plate as defined in claim 13, wherein the first punching tool forms a protrusion on the second surface of the backing plate.

15. A method of manufacturing a disc brake backing plate as defined in claim 14, wherein the protrusion has an annular shape.

16. A method of manufacturing a disc brake backing plate as defined in claim 15, wherein the longitudinal channel has a substantially circular cross section.

17. A method of manufacturing a disc brake backing plate as defined in claim 16, wherein the elongate member has a substantially cylindrical shape.

18. A method of manufacturing a disc brake backing plate as defined in claim 17, wherein the projection has a generally cylindrical shape.

19. A method of manufacturing a disc brake backing plate as defined in. claims 18, wherein the second step further comprises dividing the projection into a plurality of nibs.

20. A method of manufacturing a disc brake backing plate as defined in claim 19, wherein the plurality of nibs is two nibs, the two nibs being formed by impacting the projection by a second punching tool, the second punching tool having a chisel secured within a central portion of the second punching tool.

21. A method of manufacturing a disc brake backing plate as defined in claims 20, wherein, prior to the second step, the second surface of the plate is placed against a flat surface having a second opening defined therein; the second surface opening being adapted to secure a second bushing therein, the longitudinal axis of the chisel being aligned with the longitudinal axis of the second bushing.

22. A method of manufacturing a disc brake backing plate as defined in claim 21, wherein the second bushing is flush with the second surface.

23. A method of manufacturing a disc brake backing plate as defined in claim 21, when the second bushing projects from the second surface.

24. A method of manufacturing a disc brake backing plate for securing a friction material to a first surface thereof, the method comprising the steps of:

(a) placing a second surface of a plate against a flat surface having a cylindrical recess defined therein; said recess defining a central opening therein, the opening adapted to secure a first bushing therein, the first bushing projecting from the recess;

(b) punching the first surface with a first punching tool to form a cylindrical projection surrounding by an annular depression, the first punching tool comprising an elongate cylindrical member having a cylindrical longitudinal channel defined therein;

(c) placing the second surface of the plate against a flat surface having a second surface opening defined therein; the second surface opening adapted to secure a second bushing therein; and (d) punching the first surface with a second punching tool to divide the projection into two nibs and to form an annular ridge surrounding the depression, the second punching tool comprising a chisel secured within a central recessed portion of the second punching tool, the longitudinal axis of the second punching tool, being aligned with the longitudinal axis of the second bushing, the second punching tool having a larger diameter than the first punching tool.

* * * * *